United States Patent

[11] 3,577,771

[72] Inventor Karsten Solheim
10412 North 37th St., Phoenix, Ariz. 85028
[21] Appl. No. 756,535
[22] Filed Aug. 30, 1968
[45] Patented May 4, 1971

[54] SWING-WEIGHT AND STATIC WEIGHT BALANCE FOR GOLF CLUBS
9 Claims, 7 Drawing Figs.

[52] U.S. Cl. .................................................... 73/65, 177/246
[51] Int. Cl. ...................................................... G01m 1/12
[50] Field of Search ............................................ 73/65, 66, 456, 480, 482, 484, 487; 177/246, 251, 236

[56] References Cited
UNITED STATES PATENTS

| | | | |
|---|---|---|---|
| 3,320,795 | 5/1967 | Monroe | 73/65 |
| 2,595,717 | 5/1952 | Smith | 73/65 |
| 2,764,401 | 9/1956 | Stelzer | 177/251 |
| 2,890,036 | 6/1959 | Stelzer | 177/251 |
| 2,949,287 | 8/1960 | Linsley | 177/246 |
| 3,371,523 | 3/1968 | Crouch | 73/65 |

Primary Examiner—Richard C. Queisser
Assistant Examiner—J. Whalen
Attorney—Lindenberg and Freilich ABSTRACT: Apparatus for measuring swing weight and static weight of golf clubs adapted to employ a table or counter top as a base is provided by an elongated rigid member having: a first upright section at one end thereof to support a golf club shaft; a second upright section at the other end to hold the grip end of the club; and two longitudinally displaced rockers functioning as fulcrums between the two end sections. The position of a balance weight is adjusted to balance the rigid member on one rocker with a golf club held by the upright sections with the shaft supported by the first upright section and extending away from the second upright section. For measuring the swing weight of clubs without grips, there is provision for adjusting the position of each club so held relative to the upright sections depending on the length of its shaft. For measuring static weight, the club is held with its shaft transverse the elongated rigid member at the one end thereof and balance is obtained on the second rocker by adjusting the position of the balance weight. Swing weight or static weight is then read on a scale from the position of the balance weight, depending upon which rocker is used.

Patented May 4, 1971
3,577,771
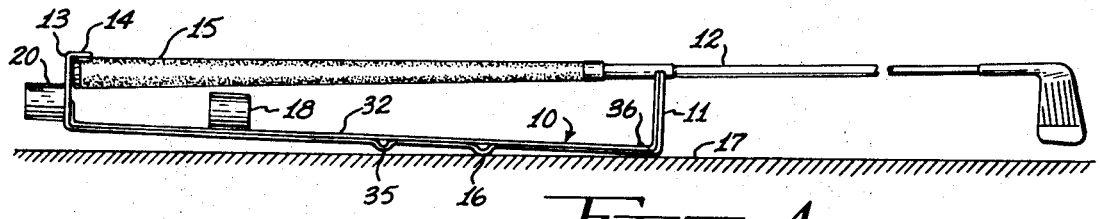
Fig-1
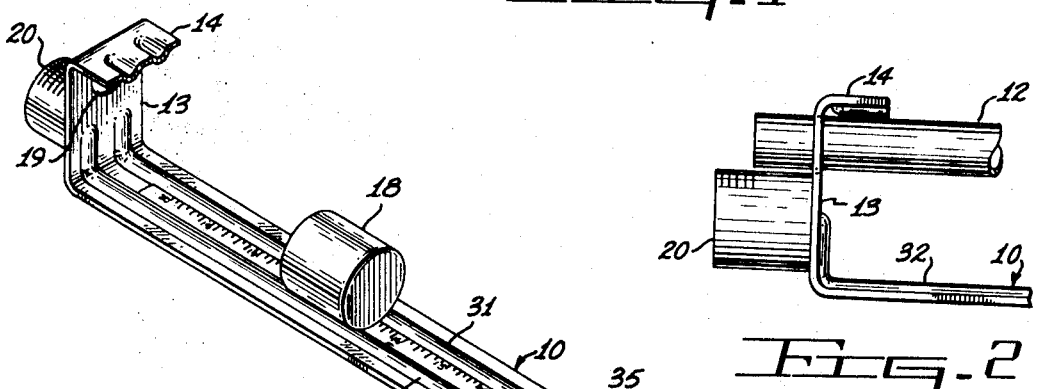
Fig-3
Fig-2
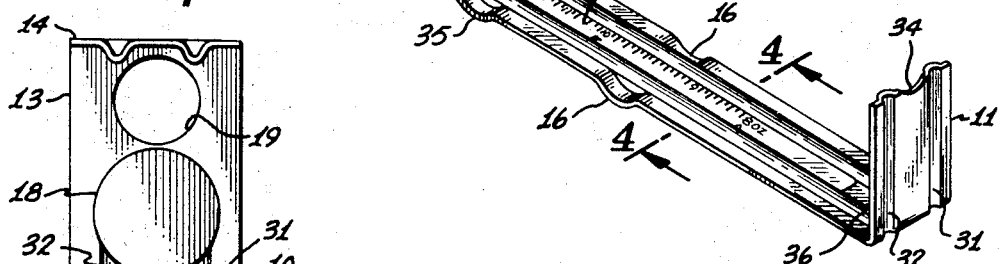
Fig-4
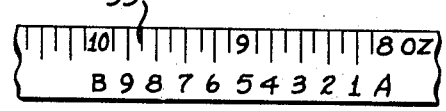
Fig-7
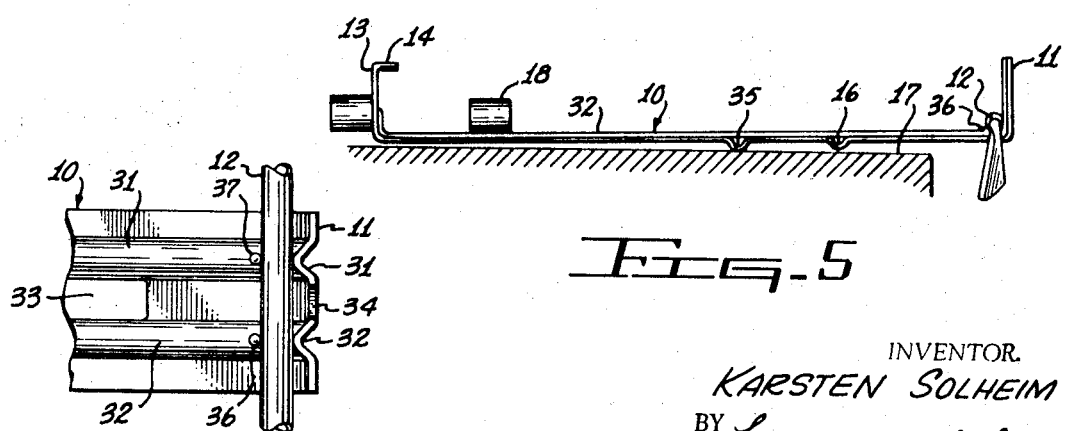
Fig-5
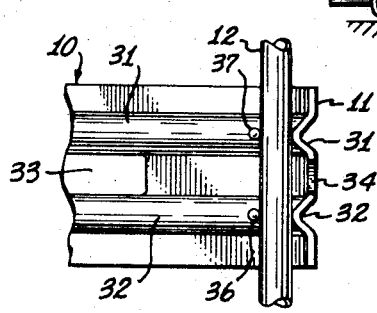
Fig-6
INVENTOR.
KARSTEN SOLHEIM
BY Lindenberg & Freilich
ATTORNEY

3,577,771

SWING-WEIGHT AND STATIC WEIGHT BALANCE FOR GOLF CLUBS

BACKGROUND OF THE INVENTION

1. Field of the Invention

This invention relates to apparatus for measuring the swing weight and static weight of golf clubs.

2. Description of the Prior Art

It is desirable to know the swing weight of a club in order to fit a set of clubs to an individual's needs. Swing weights were, at one time, measured in ounces up to as much as 28 ounces, or more, but today they are most commonly measured on an arbitrary alphabet scale from A to G. A swing weight of B is generally recommended for junior golfers, and a swing weight of C to D for ladies. The swing weights from D to G are recommended only for men. There are, of course, 10 graduations between major divisions of swing weights in order to better fit a golfer. For instance, the first five graduations of the C swing weight are considered light to medium for ladies, while the last five graduations are considered medium to heavy. For men, the first four graduations of the D swing weight are considered light to medium, and the next four, medium to heavy. Swing weights above that in the D classification and on through the G classification, are considered medium heavy to extra heavy.

It is also desirable to be able to quickly measure the swing weight of clubs in order to ascertain whether the set is properly matched. There are, of course, other factors or characteristics that should be matched or correlated, such as static weight, the fit of the grip and the flexibility of the shaft, in order that the swing feel the same during play for each club of a set. The grips and shafts are readily matched by the manufacturer, but the swing weights are not always uniform, unless sold by the manufacturer as a matched set in that regard. And even with a matched set, the golfer may wish to experiment with different swing weights by adding to or removing material from the club head. Lead tape may be conveniently used for that purpose, but, of course, once the desired swing weight is found experimentally, the golfer will want to make a more permanent adjustment to the swing weight of his clubs.

Swing weight balances presently available employ a balance arm supported on a fulcrum comprising a forked upright member having each branch terminated with a V-slot. A heavy base supports the fork, and a transverse member affixed to the balance arm holds it in the V-slots. For sensitivity, the transverse arm is provided with a knifelike edge fitting into the V-slots of the fork. The club grip is secured to one end of the arm remote from the fulcrum, while the club shaft is allowed to rest on the other end of the arm on the opposite side of the fulcrum. A balance weight is then moved along the arm until a balance is achieved. The swing weight of the club is read directly from the arm on a given side of the weight, either in ounces or in an alphabetical scale. In order to maintain the arm in a substantially horizontal position until the balance weight is in the approximate position of balance limit stops are provided above and below the grip end of the balance arm.

Some swing weight balances of the type just described have a V-slot transverse one end of the balance arm on the free end (opposite the grip end) to hold the club (with the shaft thereof transverse the length of the balance arm) for static weight measurement. The weight is then read in a manner similar to the swing weight, but from a separate scale since the swing weight will not be the same as static weight even if both scales are graduated in ounces. Although such balances have been used by golf professionals and manufacturers for a great many years with satisfactory results, there has been a need for a lightweight, low-cost balance suitable for general use by golfers as well as such professional use. Such a need could, of course, only be satisfied by a balance having substantially the same accuracy. For use by manufacturers, and golf professionals as well, the balance should be capable of measuring club swing weights before as well as after grips are placed on the shafts since the mass of the grip will have some effect on the ultimate swing weight of any club.

OBJECTS AND SUMMARY OF THE INVENTION

An object of this invention is to provide a lightweight, low cost, weight balance that employs any substantially horizontal flat surface as a base.

Another object is to provide a lightweight, low-cost balance for measurement of both swing weight and static weight of golf clubs.

Still another object is to provide a balance for measuring the swing weight of golf clubs before grips are placed on the shaft thereof.

Yet another object is to provide a balance for measurement of both swing weight and static weight of golf clubs with the same graduations serving both scales.

According to the invention, a swing weight balance adapted to employ any substantially horizontal flat surface as a base is provided by an elongated rigid member having: an upright section at one end thereof to support a golf club shaft; an upright section at the other end to hold the grip end of the club; and a first integral rocker functioning as a fulcrum between the two end sections. The position of a balance weight is adjusted to balance the rigid member on the first rocker with the golf club in place to determine its swing weight as a function of the balance weight position relative to a scale on the rigid member. To measure the swing weight of a club before a grip is placed on the shaft thereof, the club is moved back toward the other end of the rigid member a predetermined distance depending on the length of the shaft. A hole is provided in the upright section at that end to allow the club to be moved back. The hole is preferably made smaller than a grip so that the upright member functions as a stop for golf clubs with grips. A ledge or cradle above the hole, and projecting toward the one end of the rigid member which supports the slub, holds the gripped shaft in place. A permanent weight is attached to the outside of the upright section adapted to hold the grip end of the club. It is preferably attached directly below the hole provided therein, with its upper surface scored to indicate how far back a club having a shaft of a given length should be moved if it does not have a grip. The rigid member is preferably made of a flat metal sheet with at least two ridges on the top extending along the length thereof. The scale is then printed or otherwise placed between the ridges to protect it from wear as the position of the balance weight is adjusted in balancing the rigid member on the first rocker while a club is supported in a cantilever fashion by the two upright sections.

To measure static weight, a club is placed on the rigid member adjacent the one end thereof with its shaft transverse the length of the rigid member, and held there by detents extending upwardly from the ridges on the rigid member while the position of the balance weight is adjusted to balance the rigid member on a second integral rocker functioning as a fulcrum more remote from the one end thereof than the first rocker. Static weight is then determined as a function of the balance weight position relative to a scale on the rigid member. The position of the second rocker relative to the first is so selected as to enable the same graduations to be used for both static and swing weight measurements by simply marking the scale for swing weight and for static weight on the same series of graduations.

The novel features of the invention are set forth with particularity in the appended claims. The invention will best be understood from the following description when read in conjunction with the accompanying drawings.

BRIEF DESCRIPTION OF THE DRAWINGS

FIG. 1 is a side view of the present invention illustrating the manner in which it is employed for measuring the swing weight of a golf club having a grip on the shaft.

FIG. 2 is a view of the grip-holding end of the present invention illustrating the manner in which it is employed for measuring the swing weight of a golf club not having a grip on the shaft.

FIG. 3 is an isometric view of the present invention.

FIG. 4 is a sectional view of FIG. 3 taken on a line 4—4.

FIG. 5 is a side view of the present invention illustrating the manner in which it is employed for measuring the static weight of a golf club.

FIG. 6 is a plan view of one end of the present invention illustrating the manner in which a golf club shaft is held stationary while measuring the static weight of a golf club in the manner illustrated in FIG. 5.

FIG. 7 illustrates a portion of a scale for the present invention.

DESCRIPTION OF THE PREFERRED EMBODIMENTS

Referring now to FIG. 1, the present invention comprises an elongated rigid member 10 having an upright section 11 to support a golf club shaft 12. An upright section 13 at the other end of the member 10 is provided with a ledge 14 to hold the grip 15 of the club. An integral rocker 16 functioning as a fulcrum between the two end sections is adapted to rest on a table or counter top 17. A balance weight 18 is then positioned along the member 10 until the assembly is in a balanced position with only the rocker 16 resting on the table or counter top 17 substantially as shown. The swing weight of the club is then read directly on the right-hand side of the weight 18 from a scale on the member 10.

The rocker 16 is preferably in the form of an arc which subtends a small angle (about 45°) of a relatively large circle (having a radius of about 2 inches). For sensitivity it would seem that the radius of the circle should be minimized since the pivotal axis of the assembly moves to the right, or the left, as the assembly rocks forward, or backward. However, sufficient sensitivity is achieved without that constraint because the assembly is not permitted to rock but a few degrees before either the upright sections 11 or a second integral rocker functioning as a fulcrum 35 will rest upon the table 17. In other words, in the critical range of balance, very little rocking motion is produced as the weight 18 is moved back and forth to locate the exact position of balance. This is so because the rockers 16 and 35 support the rigid member about 0.12 inches above the table or counter top 17.

To measure the swing weight of a golf club without a grip, hole 19 is provided in the upright member 13 to allow the shaft 12 of the club to extend a predetermined amount to the left of it as shown in FIG. 2. A ledge 20 extending from the upright member 13 is scored to show how far the shaft should extend through the hole for each shaft length. In practice, the ledge 20 is a counterweight selected in coordination with the balance weight 18 and the scale employed. The longer shafts should extend to the left more than the shorter shafts. Accordingly, the left most mark would be for 39-inch shafts and the rightmost scoring for 35-inch shafts. Three equally spaced marks are scored between those extremes for 36-, 37- and 38-inch shafts. The exact position for the marks may be determined experimentally by first balancing the scale with the grip on any club and then, after removing the grip, moving the shaft through the hole in the upright section 13 until balance is restored. The same amount would then suffice for any other club of the same shaft length regardless of its swing weight.

FIG. 3 is an isometric view of a preferred embodiment of the present invention showing how the upright sections 11 and 13 of the rigid member 10 are formed from a continuous strip of metal having two longitudinal ridges 31 and 32 which not only contribute to the rigidity of the member 10 but also provide holding rails for the cylindrical weight 18, as may be more clearly seen in FIG. 4 which illustrates a sectional view taken along the line 4-4 of FIG. 3. An additional advantage to be derived from the ridges 31 and 32 is that they support the weight away from a scale 33 therebetween. Consequently, the scale 33 may be applied in any convenient manner without regard to wear, such as by silk screening or by simply printing the scale on a strip of adhesive tape.

The ridges 31 and 32 are preferably made on a straight strip of metal before the upright sections 11 and 11 are formed. The upright section 13 is then formed by simply cutting a notch 34 at the end to receive a club shaft and bending a sufficient length upwardly (in the direction of the ridges) through approximately a right angle. The upright section 13 is formed by cutting the hole 19 and then bending a sufficient length upwardly through approximately a right angle. The end of that length thus bent to form the upright section 13 is then crimped and bent through approximately a right angle in the direction of the upright section 11 to form the ledge 14 as shown. To facilitate cutting the hole 19 and forming the ledge 14, the ridges 31 and 32 are not extended into the section 13 but for a short distance as more clearly shown for the ridge 32 in FIG. 2. The ledge 20 is secured to the outside of the upright section 13 directly below the hole 19 in any suitable manner, as by welding or brazing, and the rocker 16 is formed by crimping the edges of the rigid member as shown in FIG. 3.

The second rocker 35 is provided in a position more remote from the upright section 11 than the first rocker 16 for measuring the static weight of a golf club while it is held adjacent the upright section 11 (with the shaft 12 transverse the length of the rigid member 10) as shown in FIG. 5. The club shaft 12 is so held by upwardly extending detents 36 and 37 on respective ridges 32 and 31 as shown in FIG. 6. Alternatively, the shaft 12 may be so held by a tab cut from the horizontal portion of the rigid member 10 and bent upwardly. The position of the balance weight 18 is adjusted along the ridges 31 and 32 until only the rocker 35 rests on the table or counter top 17 as shown in FIG. 5. The weight may then be read from the scale 33 directly in ounces.

The position of the second rocker 35 relative to the first rocker 16 is so selected that 10 large graduations of the swing weight scale between major divisions A, B—G may be used for graduations in fifths of an ounce of the static weight, as illustrated in FIG. 7 for the graduations between swing weights A and B. Thus, by placing a scale in ounces on the same graduations, the graduations for the swing weights A and B are also used for the major divisions of 8 and 10 ounces, respectively. Accordingly, the graduation for the intermediate swing weight A—7—5 is also used for the intermediate static weight of 9.5 ounces. Phasing the scales in that manner not only permits use of common graduations but also facilitates reading or distinguishing each.

In a preferred embodiment, the rigid member 10 is only about 19.75 inches long between upright sections and the rocker 16 is formed about 14.06 inches from the upright section 13. The length of the upright sections 11 and 13 are so selected that a straight line running from the lower surface of the ledge 14 to the bottom of the notch 34 is substantially parallel to the rigid member 10 between the sections 11 and 13 in order that with a golf club in place and the scale off balance to the right more than as shown in FIG. 1, the club head will not reach the table or counter top. In that manner, use of the balance scale will not require the precaution of placing it so that it overhangs the table or counter.

Although a particular embodiment of the invention has been described and illustrated, it should be noted that other embodiments may be readily devised without departing from the present invention in its broadest aspects. For instance, the means for compensating the swing weight balance of a golf club without a grip shown as the table 19 in the upright section 13 may instead be a different size balancing weight 18 or counterweight 20 for each club length, but the use of the hole 19 and the single set of weights 18 and 20 is preferred in order to obviate the need for storing weights of different sizes. As another example, although a unitary construction for the rigid member 10 and upright sections 11 and 13 is to be preferred, other forms of construction may be employed, and even with a unitary construction, the choice of material may include plastics as well as metal, but the latter is preferred because of the ease with which it can be formed without heating. As still another example, the function of the ledge 14 and the hole 19 may be fulfilled by other means such as the counterweight on the inside of the upright section 13, but of smaller diameter to receive the club shaft without a grip and a small pin protruding from the center of the counterweight that will penetrate the grip of a club. In that manner, the axis of the shaft may be held in the same position on the balance whether the club has a grip or not, and the shaft position may be adjusted toward the upright section 13 when the club does not have a grip. To maintain the same scale, the distance between the rocker 16 and the upright section 13 would then have to be lengthened and the counterweight 20 reduced in size to compensate for the increased weight of the rigid member 10 on that side of the rocker 16. It would also be desirable to incline the counterweight and pin assembly upwardly so that its axis will more nearly always coincide with the axis of the club shaft whether it has a grip or not, and if not, regardless of the length of the shaft. Accordingly, it is intended that the claims embrace other embodiments of the invention.

I claim:

1. A swing weight balance adapted to employ any substantially horizontal flat surface as a base comprising:

an elongated rigid member having a first upright section at one end thereof for supporting a golf club shaft, a second upright section at the other end functioning as a positioning stop for a golf club with means for holding the grip end of said shaft, and an integral rocker between said upright sections extending from said rigid member in a direction opposite said upright sections for the purpose of resting on said flat surface while in use;

a balancing weight adjustable in position on said member between said upright sections;

a graduated scale placed in a position on said member for indicating the swing weight of a golf club by the position of said balancing weight with respect thereto when its position is adjusted that only said rocker rests upon said horizontal flat surface; and means for compensating for an increase in the apparent swing-weight balance of a golf club without a grip.

2. A swing-weight balance as defined in claim 1 wherein said means comprises a hole in said second upright section of a diameter greater than the diameter of the grip end of a golf club shaft but smaller than the diameter of the grip of a golf club at the butt end thereof, whereby a club without a grip on its shaft may be balanced to determine its swing weight by moving its shaft through said hole until it protrudes therethrough a predetermined amount which depends upon its length.

3. A swing-weight balance as defined in claim 2 wherein said second upright section includes an element extending therefrom in a direction away from said rigid member, said element having marks thereon for indicating the amount a shaft should protrude through said hole for a given shaft length.

4. A swing-weight balance as defined in claim 3 wherein said element is a fixed counterweight.

5. A swing-weight balance adapted to employ any substantially horizontal flat surface as a base comprising:

an elongated rigid member consisting of a flat sheet of material having at least two longitudinal ridges and having a first upright section at one end thereof for supporting a golf club shaft, a second upright section at the other end with means for holding the grip end of said shaft, and an integral rocker between said upright sections extending from said rigid member in a direction opposite said upright sections for the purpose of resting on said flat surface while in use;

a balancing weight adjustable in position on said two longitudinal ridges between said upright sections, said ridges extending in a direction away from said rocker to support said balancing weight away from a flat portion of said sheet between said ridges; and a graduated scale placed on said flat portion between said ridges of said elongated rigid member for indicating the swing weight of a golf club by the position of said balancing weight with respect thereto when its position is so adjusted that only said rocker rests upon said horizontal flat surface.

6. A swing-weight balance as defined in claim 5 wherein said integral rocker comprises a crimp on each edge of said sheet.

7. A swing-weight balance as defined in claim 6 wherein said crimp on each edge of said sheet supports said member a small fraction of an inch above said surface and is an arc which subtends a small angle of a circle that is large in diameter relative to said small fraction of an inch.

8. A swing-weight balance adapted to employ any substantially horizontal flat surface as a base comprising:

an elongated rigid member having a first upright section at one end thereof for supporting a golf club shaft, a second upright section at the other end with means for holding the grip end of said shaft, and an integral rocker between said upright sections extending from said rigid member in a direction opposite said upright sections for the purpose of resting on said flat surface while in use;

a balancing weight adjustable in position on said member between said upright sections;

a graduated scale placed in a position on said member for indicating the swing weight of a golf club by the position of said balancing weight with respect thereto when its position is so adjusted that only said rocker rests upon said horizontal flat surface;

means for holding a club adjacent said first upright section with its shaft transverse the length of said rigid member; and a second integral rocker between said upright sections for weight balancing said club while measuring the static weight thereof by adjusting the position of said weight balance until only said second rocker rests upon said flat surface, said second rocker being placed between said upright sections such that upon so adjusting the position of said balancing weight, the static weight may be read from the same graduations of said scale, and said scale is provided with legends for major divisions of both said swing weight and said static weight, major divisions of said swing weight coinciding with major divisions of said static weight.

9. A swing-weight balance as defined in claim 8 wherein successive major divisions of said swing weight are identified by successive letters of the alphabet, and the same major divisions are identified in succession by a series of integers, each integer of the series being greater than the last by two.